United States Patent
Andreycak

(10) Patent No.: US 7,375,994 B2
(45) Date of Patent: May 20, 2008

(54) HIGHLY EFFICIENT ISOLATED AC/DC POWER CONVERSION TECHNIQUE

(75) Inventor: William M. Andreycak, Bedford, NH (US)

(73) Assignee: Texas Instruments Incorporated, Dallas, TX (US)

( * ) Notice: Subject to any disclaimer, the term of this patent is extended or adjusted under 35 U.S.C. 154(b) by 47 days.

(21) Appl. No.: 11/247,048

(22) Filed: Oct. 11, 2005

(65) Prior Publication Data

US 2007/0081364 A1    Apr. 12, 2007

(51) Int. Cl.
*H02M 7/21* (2006.01)
*G05F 1/70* (2006.01)

(52) U.S. Cl. .......................... 363/89; 363/17
(58) Field of Classification Search .................. 363/17, 363/89
See application file for complete search history.

(56) References Cited

U.S. PATENT DOCUMENTS

| | | | | |
|---|---|---|---|---|
| 4,533,986 A | * | 8/1985 | Jones | 363/17 |
| 4,860,184 A | * | 8/1989 | Tabisz et al. | 363/17 |
| 5,359,278 A | * | 10/1994 | Notohara et al. | 323/222 |
| 5,367,448 A | * | 11/1994 | Carroll | 363/89 |
| 5,576,940 A | * | 11/1996 | Steigerwald et al. | 363/17 |
| 5,771,164 A | * | 6/1998 | Murai et al. | 363/89 |
| 5,774,346 A | * | 6/1998 | Poon et al. | 363/17 |
| 5,808,879 A | * | 9/1998 | Liu et al. | 363/17 |
| 5,991,180 A | * | 11/1999 | Vogel et al. | 363/89 |
| 6,091,233 A | * | 7/2000 | Hwang et al. | 323/222 |
| 6,115,276 A | * | 9/2000 | Mao | 363/127 |
| 6,147,881 A | * | 11/2000 | Lau | 363/17 |
| 6,256,209 B1 | * | 7/2001 | Gurwicz et al. | 363/17 |
| 6,344,986 B1 | * | 2/2002 | Jain et al. | 363/89 |
| 6,538,909 B2 | * | 3/2003 | Goodarzi et al. | 363/98 |
| 6,714,425 B2 | * | 3/2004 | Yamada et al. | 363/21.12 |
| 6,836,414 B1 | * | 12/2004 | Batarseh et al. | 363/17 |
| 6,980,446 B2 | * | 12/2005 | Simada et al. | 363/49 |
| 7,012,818 B2 | * | 3/2006 | Kotsuji et al. | 363/21.01 |
| 7,183,753 B2 | * | 2/2007 | Tsuruya | 323/222 |

* cited by examiner

*Primary Examiner*—Jeffrey Sterrett
(74) *Attorney, Agent, or Firm*—Warren L. Franz; Wade J. Brady, III; Frederick J. Telecky, Jr.

(57) ABSTRACT

An AC-to-DC power converter that is capable of generating a regulated, isolated DC voltage output from a power factor corrected AC voltage input with improved efficiency. The AC-to-DC power converter is a two-stage power converter including a PFC stage connected in series to a power conversion stage. The PFC stage performs power factor correction using a zero current switching technique, and the power conversion stage includes a zero voltage switched half-bridge converter. The power conversion stage includes a transformer for providing the isolated DC voltage output. The AC-to-DC power converter includes a single feedback control loop for transferring error information from the DC voltage output to the PFC stage, thereby obtaining regulation of the DC voltage output.

10 Claims, 1 Drawing Sheet

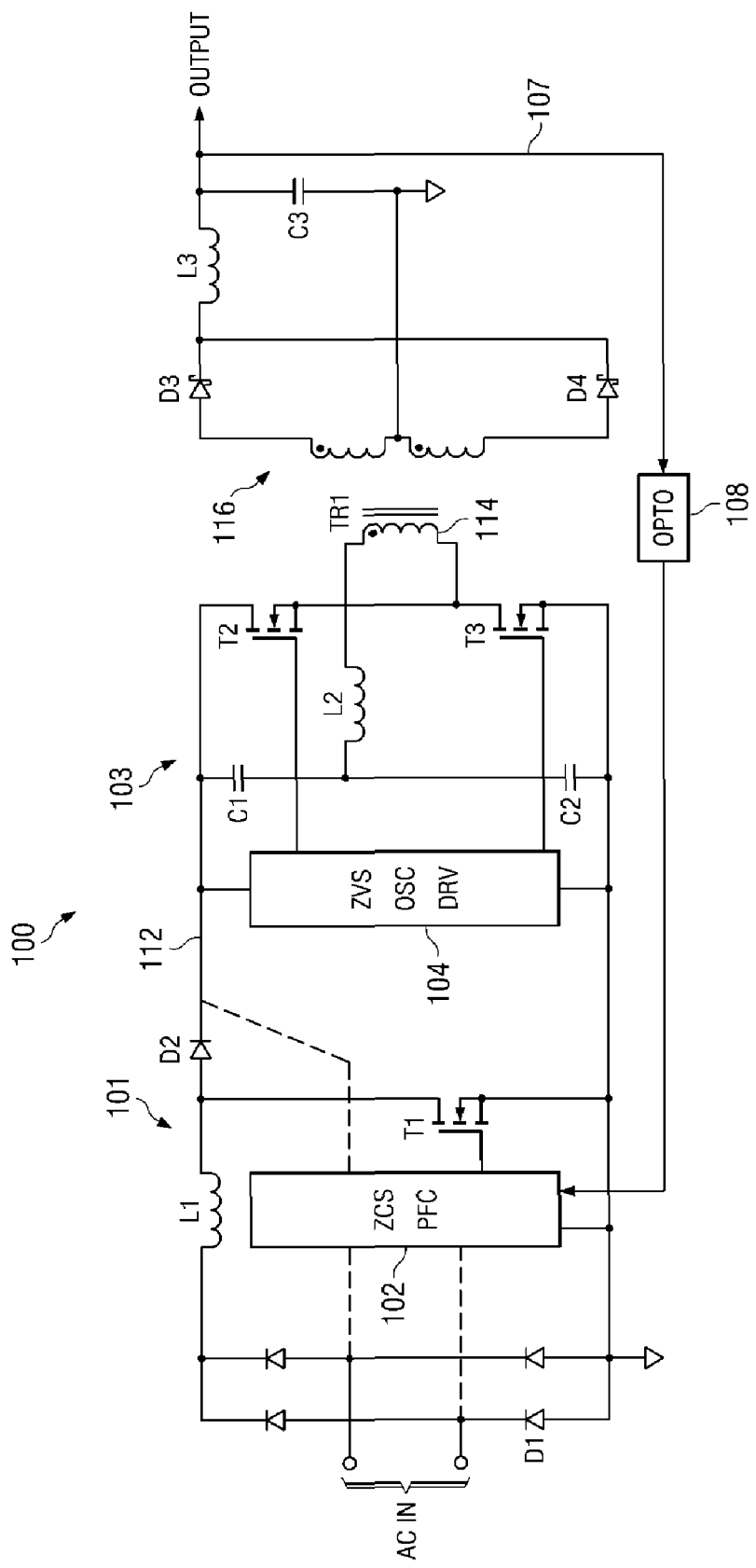

HIGHLY EFFICIENT ISOLATED AC/DC POWER CONVERSION TECHNIQUE

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates generally to AC-to-DC power conversion techniques, and more specifically to a technique for providing a regulated, isolated DC output voltage from a power factor corrected AC input voltage with increased efficiency.

AC-to-DC power converters are known that employ power factor correction techniques to assure low input harmonic current content. For example, a conventional two-stage AC-to-DC power converter comprises a first voltage regulator stage connected in series to a second voltage regulator stage. The first voltage regulator stage includes a power factor corrected front end operative to receive an AC power input, and to convert an AC voltage to a high level regulated DC voltage. The second voltage regulator stage comprises a DC-to-DC power supply section operative to receive the high level regulated DC voltage generated by the first voltage regulator stage, to convert the high level DC voltage to a lower level regulated DC voltage, and to provide the lower level DC voltage as an isolated DC voltage output. To regulate the DC voltages generated by the first and second stages, each stage includes a feedback control loop operative to transfer amplitude (error) information from the voltage output to the respective stage for use in adjusting the regulated DC voltages to the desired amplitude. The conventional two-stage AC-to-DC power converter described above has drawbacks, however, in that the multiple control loops associated with the first and second stages significantly increase the complexity of the power converter, thereby increasing both the size and cost of manufacture of the overall circuit.

It would therefore be desirable to have an AC-to-DC power converter that is capable of generating a regulated, isolated DC voltage output using a simpler control loop configuration. Such an AC-to-DC power converter would have a reduced size and reduced power requirements. It would also be desirable to have an AC-to-DC power converter with improved efficiency.

BRIEF SUMMARY OF THE INVENTION

In accordance with the present invention, an AC-to-DC power converter is provided that is capable of generating a regulated, isolated DC voltage output from a power factor corrected AC voltage input with improved efficiency. In one embodiment, the AC-to-DC power converter is a two-stage power converter including a first power factor correction (PFC) stage connected in series to a second power conversion stage. The PFC stage is operative to perform power factor correction using a zero current switching technique, and the power conversion stage includes a zero voltage switched half-bridge converter. The zero current switching of the PFC stage and the zero voltage switching of the power conversion stage reduce the power requirements and improve the efficiency of the AC-to-DC power converter. The power conversion stage includes a transformer for providing the isolated DC voltage output.

To regulate the isolated DC voltage output, the AC-to-DC power converter employs a single feedback control loop for transferring amplitude (error) information from the DC voltage output to the PFC stage. The feedback control loop includes an opto-coupler for maintaining the required isolation of the DC voltage output. In one mode of operation, the isolated DC voltage output is regulated by adjusting the operating duty cycle of the PFC stage to obtain a voltage level at the first stage output that is sufficient to provide a desired regulated DC voltage level at the isolated voltage output.

By providing a zero current switched power factor correction front end followed by a zero voltage switched isolation converter, AC-to-DC power conversion can be achieved with reduced circuit size and complexity, reduced power requirements, and improved efficiency.

Other features, functions, and aspects of the invention will be evident from the Detailed Description of the Invention that follows.

BRIEF DESCRIPTION OF THE SEVERAL VIEWS OF THE DRAWINGS

The invention will be more fully understood with reference to the following Detailed Description of the Invention in conjunction with the drawings of which:

FIG. 1 is a schematic diagram of an AC-to-DC power converter according to the present invention.

DETAILED DESCRIPTION OF THE INVENTION

An AC-to-DC power converter is disclosed that can generate a regulated, isolated DC voltage output from a power factor corrected AC voltage input with improved efficiency. This highly efficient AC-to-DC power converter is a two-stage power converter that includes a zero current switched power factor correction front end followed by a zero voltage switched isolation converter for reducing the size, complexity, and power requirements of the overall circuit.

FIG. 1 depicts an illustrative embodiment of an AC-to-DC power converter 100, in accordance with the present invention. In the illustrated embodiment, the AC-to-DC power converter 100 is a two-stage power converter comprising a first power factor correction (PFC) stage 101, a second power conversion stage 103, an LC low pass filter including an inductor L3 and a capacitor C3, and a single feedback control loop 107 including an opto-coupler 108. The AC-to-DC power converter 100 is configured to receive an AC power input at the input of the PFC stage 101, and to provide a regulated, isolated DC voltage output at the output of the LC low pass filter.

More specifically, the PFC stage 101 includes a full bridge rectifier D1, an inductor L1, a transistor T1, a diode D2, and a PFC circuit 102. In the preferred embodiment, the PFC circuit 102 is operative to perform power factor correction using a high efficiency zero current switching (ZCS) technique. The power conversion stage 103 includes an oscillator driver circuit 104, resonant capacitors C1-C2, a resonant inductor L2, switching transistors T2-T3, a transformer TR1, and zener diodes D3-D4. In the preferred embodiment, the power conversion stage 103 is a half bridge converter configured to employ a high efficiency zero voltage switching (ZVS) technique. The feedback control loop 107 is configured to transfer amplitude (error) information from the isolated DC voltage output to the PFC circuit 102 for regulating the DC voltage output. The transformer TR1 includes a primary winding 114 and secondary windings 116. The transformer TR1 is configured to provide isolation of the DC voltage output, and the primary and secondary windings 114, 116 are configured to provide a desired DC voltage level at the isolated voltage output.

As described above, the PFC circuit 102 performs power factor correction using a zero current switching (ZCS) technique. Those of ordinary skill in this art will appreciate that zero current switching is a resonant or quasi-resonant switching technique suitable for use in low to high frequency power converters. Specifically, the PFC circuit 102 is operative to turn the switching transistor T1 on and off at times in the resonant cycle when substantially zero current flows through the transistor, thereby resulting in zero current switching. Because substantially zero current is flowing through the transistor T1 when the transistor is turned on and off, the power consumption of the PFC stage 101 is significantly reduced. For example, the PFC circuit 102 can be implemented using the Transition Mode PFC Controller UCC28051 sold by Texas Instruments Incorporated™, Dallas, Tex., U.S.A., or any other suitable PFC controller circuit.

As also described above, the half bridge converter of the power conversion stage 103 employs a zero voltage switching (ZVS) technique. Those of ordinary skill in this art will further appreciate that the zero voltage switching technique is suitable for use in resonant or quasi-resonant power converters. Specifically, the oscillator driver circuit 104 is operative to control the duty cycle (i.e., the on and off times) of the switching transistors T2-T3 with effectively resonant switching transitions. During the off time of the respective transistors T2-T3, the circuit comprising the resonant inductor L2 and capacitors C1-C2 resonates, and the voltage across the respective transistors rises from zero to a peak voltage level, and subsequently falls from the peak voltage back to zero. At this time, the oscillator driver circuit 104 turns the respective switching transistor on, thereby achieving substantially loss-less zero voltage switching. Such switching of the respective transistors T2-T3 when the voltage across the transistor is zero significantly reduces the power consumption of the power conversion stage 103. For example, the oscillator driver circuit 104 can be implemented using the Primary-Side Push-Pull Oscillator with Dead-Time Control UCC28089 sold by Texas Instruments Incorporated™, Dallas, Tex., U.S.A., or any other suitable oscillator driver circuit. In the preferred embodiment, the PFC and power conversion stages 101 and 103 are provided with protection circuits (not shown) to prevent failure of the AC-to-DC power converter 100 resulting from overload or otherwise adverse conditions.

To regulate the isolated DC voltage output of the AC-to-DC power converter 100, the feedback control loop 107 transfers amplitude (error) information from the DC voltage output to the PFC circuit 102 via the opto-coupler 108, and the PFC circuit 102 adjusts its effective operating duty cycle based on the amplitude (error) information to obtain a voltage level at the first stage output (i.e., at a node 112) that is sufficient to provide a desired regulated DC voltage level at the isolated voltage output. In the presently disclosed embodiment, the operating duty cycle of the PFC circuit 102 is adjusted to control the on and off times of the switching transistor T1 operating in accordance with the zero current switching technique, thereby obtaining the desired voltage level at the node 112.

Regulation of the voltage output of the half bridge converter of the power conversion stage 103 can be accomplished by adjusting its effective operating duty cycle based on amplitude (error) information obtained from the voltage output. Because the AC-to-DC power converter 100 comprises the single feedback control loop 107 that transfers the amplitude (error) information from the isolated DC voltage output to the PFC circuit 102, the half bridge converter is configured to operate at a predetermined fixed duty cycle. In the presently disclosed embodiment, the half bridge converter operates at approximately a 50%/50% duty cycle. It is understood, however, that the half bridge converter of the power conversion stage 103 may alternatively be configured to operate at any other suitable fixed duty cycle. In the preferred embodiment, the half bridge converter operates at about a 50%/50% duty cycle with a programmable deadtime between alternating switching transistor activations.

It will further be appreciated by those of ordinary skill in the art that modifications to and variations of the above-described highly efficient isolated AC/DC power conversion technique may be made without departing from the inventive concepts disclosed herein. Accordingly, the invention should not be viewed as limited except as by the scope and spirit of the appended claims.

What is claimed is:

1. An AC-to-DC converter, comprising:
   an AC power input;
   a full bridge rectifier operative to receive AC voltage and current from the AC power input, and to convert the AC voltage and current to rectified voltage and current;
   a power factor correction (PFC) stage operative to receive the rectified voltage and current, and to provide power factor corrected voltage and current, wherein the PFC stage includes at least one first switching device operative to switch the rectified current in accordance with a zero current switching technique;
   a power conversion stage operative to receive the power factor corrected voltage and current, and to provide an isolated DC voltage output; the power conversion stage includes an isolation transformer having primary and secondary windings, and a plurality of second switching devices operatively coupled to the primary winding of the transformer, the plurality of second switching devices being operative to switch the power factor corrected current in accordance with a zero voltage switching technique; and
   a feedback control loop operative to provide error information from the DC voltage output to the PFC stage for controlling a duty cycle of the first switching device, thereby obtaining regulation of the isolated DC voltage output.

2. The AC-to-DC converter of claim 1, wherein the feedback control loop includes an opto-coupler disposed between the isolated DC voltage output and the PFC stage.

3. The AC-to-DC converter of claim 1, further including a low pass filter disposed between the transformer and the isolated DC voltage output.

4. The AC-to-DC converter of claim 1, wherein the power conversion stage comprises a zero voltage switched half-bridge converter.

5. The AC-to-DC converter of claim 4, wherein the zero voltage switched half-bridge converter operates at a predetermined duty cycle.

6. The AC-to-DC converter of claim 5, wherein the predetermined duty cycle is fixed.

7. A method of performing an AC-to-DC power conversion, comprising the steps of:
- receiving AC voltage and current from an AC power input;
- converting the AC voltage and current to rectified voltage and current;
- converting the rectified voltage and current to power factor corrected voltage and current, the converting step including switching the rectified current by at least one first switching device in accordance with a zero current switching technique; and
- converting the power factor corrected voltage to an isolated DC voltage outputs;
- wherein the second converting step further includes switching the rectified current by the switching device based on error information from the DC voltage output, thereby obtaining regulation of the DC voltage output; and
- wherein the third converting step includes switching the power factor corrected current by a plurality of second switching devices in accordance with a zero voltage switching technique.

8. The method of claim 7, wherein the power factor corrected current is switched by the plurality of second switching devices operating at a predetermined duty cycle.

9. The method of claim 8, wherein the predetermined duty cycle is fixed.

10. The method of claim 7, further including the step of low pass filtering the DC voltage output.

* * * * *